April 9, 1946.  E. F. ALLEN  2,398,070
SELF-LOCKING SET SCREW
Filed Oct. 7, 1944
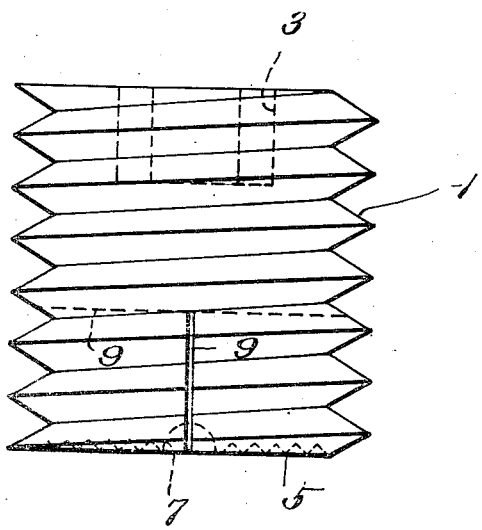
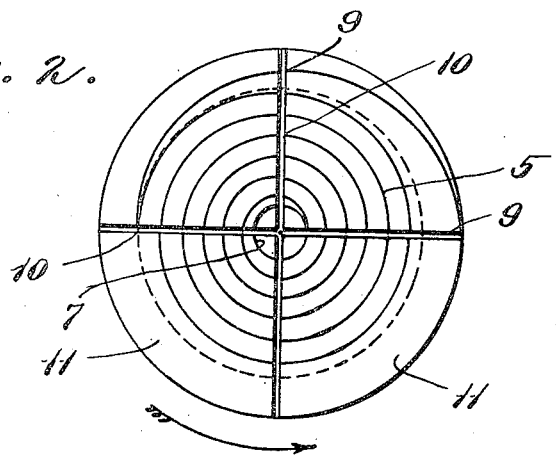
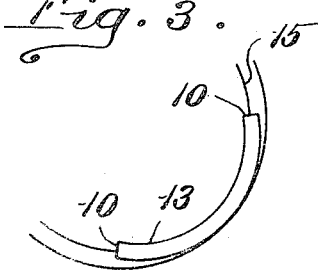
Inventor.
Earle F. Allen,
By Robert K. Randall,
Atty.

Patented Apr. 9, 1946

2,398,070

UNITED STATES PATENT OFFICE 2,398,070

SELF-LOCKING SET SCREW

Earle F. Allen, Wellesley Hills, Mass.

Application October 7, 1944, Serial No. 557,589

12 Claims. (Cl. 151—37)

This invention relates to set screws, and has for its object the provision of a novel and improved self-locking set screw of simple and easily-manufactured one-piece construction which will lock tightly within the threaded hole to which it is applied without mutilation of the threads of either part, and which therefore can be easily and repeatedly locked and freed when desired without injury to these parts, and which will above all perform its holding function in the presence of severe vibration and even in the event and relaxation of its endwise pressure on the part against which it is tightened. To these ends, the invention provides a set screw of standard shape and size having a peripheral screw thread of customary type, but having an end portion of slotted, split, or otherwise expansible construction, and an arrangement of ridges, projections, threads, notches, or other devices on the terminal surface of such end portion, which devices engage the opposing surface against which the set screw is driven home, and through the combined advance and rotation of the set screw during the final tightening of the latter dig into the opposing surface in a manner causing such end portion of the set screw to expand radially into tight frictional engagement with the interior surfaces of the threaded hole in which the set screw is located.

Other objects of the invention, and the manner of their attainment, are as set forth hereinafter.

An illustrative embodiment of the invention is shown in the accompanying drawing in which—

Fig. 1 is a side elevation of the novel set screw.

Fig. 2 is an end view of the working end of the set screw.

Fig. 3 is a diagram illustrating an additional feature of the gripping action of the set screw.

The invention is shown applied to a set screw of the "blind," or headless type, of generally conventional shape and size, comprising an initially cylindrical body threaded throughout its length with an exterior or peripheral screw thread 1 of standard design and of right hand twist, and having a hexagonal socket 3 in its outward end for the application of a wrench to be used in turning it, though it is immaterial to the invention whether a screw-driver slot, an external polygonal head, or other resort be used for this purpose.

The inner or working end of the set screw terminates in a plane surface disposed at right angles to the axis of the set screw, in which surface is cut a spiral screw thread 5 of left-hand twist, i. e., winding outward from the axis of the set screw in a counter clockwise direction as viewed in looking at this end of the set screw, Fig. 2. Preferably this left-hand spiral thread occupies substantially the entire area of this terminal surface of the set screw, otherwise all parts of this surface left unthreaded are cut back at least to the depth of the screw thread. For convenience in manufacture, a starting hole 7 is provided in the center of the terminal surface for the thread cutting tool.

Slots 9, conveniently but not necessarily extending diametrically and at right angles to each other, extend axially from the terminal surface bearing the thread 5 for a substantial part of the length of the set screw, to permit radial expansion of this end-portion into tight frictional engagement with the corresponding female threads of the hole receiving the set screw.

As a result of the cutting of the slots 9 across the thread 5, cutting edges are produced at each end of each quarter-turn of the thread 5 at the sides of the slots 9, namely, at the points 10. As the set screw is tightened against the shaft or other surface confronting its spiral threaded end, these cutting edges at 10 cut concentric or outwardly spiraling notches or grooves in such opposing surface which the adjacent portions of the thread 5 follow. Since these adjacent and following portions of the thread 5 have a continuously diminishing radius, on account of the left-hand twist of the spiral, and the advance of the set screw in driving it home forces the thread 5 ever deeper into these notches or grooves, this interaction serves to cam the segments 11 of the split end of the set screw radially outward into tight frictional engagement with the threaded side walls of the hole in which the set screw is located. Any degree of expansion and of consequent frictional engagement of the male threads with the female threads of the hole to lock the set screw against loosening may be obtained up to the limits of the strength and character of the materials, by increasing the rotational force applied to drive the set screw home.

The pitch of the peripheral thread will be made finer as the difficulty met with by the cutting edges 10 in cutting into the opposing surface increases.

An additional locking action is also obtained as a result of forcing the segments of the spiral thread 5 to try to follow notches or grooves of greater radius cut in the opposing surface. This is illustrated in Fig. 3, in which a segment 13 of the thread 5 from one quadrant 11 is forced to follow a notch or groove 15 cut by a different segment of this thread 5 on the same or a different sector 11. As each segment of the thread 5 is forced to try to occupy a groove cut on a longer radius, and as the difference in the curvature of the segment of thread 5 and such groove becomes more pronounced with the greater degree of rotation of the set screw after the thread 5 begins to bite into the opposing surface, the inner corners of the cutting edges 10 which cannot follow the groove 15 cut into the inward side wall of such groove 15 while the mid-portions of the length of such segment 13 wedge outwardly against the outer side of groove 15, thus creating further resistance to rotation of the set screw and aiding in locking it in place.

It is a well-known fault of the ordinary type of set screw that an infinitesimal amount of play between the working end of set screw and the opposing surface will result in relaxing the endwise pressure on the screw which is essential to hold it tight. In the present structure, however, since the pressure which holds the set screw tight is that created between the sides of the set screw and the sides of the hole, and is exerted at right angles to the axis, and is created by the camming action of surfaces on the end of the screw and on the opposing surface which have a very material degree of depth in the axial direction, a much greater degree of play can arise at this point as a result of the wear unavoidably occurring under intense vibration, without diminishing the friction and the locking action created between the expanded end of the set screw and the side walls of the hole to a point releasing the screw enough to permit it to rotate reversely and back out of its own accord.

While I have illustrated and described a certain form in which my invention may be embodied, I am aware that many modifications may be made therein by any person skilled in the art, without departing from the scope of the invention as expressed in the claims. Therefore, I do not wish to be limited to the particular form shown, or to the details of construction thereof, but What I do claim is:

1. A set screw having a peripheral screw thread and also having an axially projecting spiral thread on its terminal surface formed by a plurality of continuous turns.

2. A set scew having a peripheral screw thread and also having an axially projecting spiral thread on its terminal surface having a plurality of turns covering substantially the entire area of such end.

3. A set screw having a right-hand peripheral screw thread and also having a flat left-hand spiral thread on its end.

4. A set screw having in combination a peripheral screw thread and an end surface disposed substantially in a radial plane and provided with a spiral thread of the opposite hand to that of the peripheral screw thread.

5. A set screw having a cylindrical surface provided with a helical screw thread and an end surface formed with an axially projecting ridge extending spirally around the axis of the screw for a plurality of turns.

6. A set screw having a peripheral screw thread and a split end-portion terminating in a spirally-threaded face.

7. A set screw having a peripheral screw thread and a split end-portion having a terminal surface equipped with projecting ridges adapted to engage and cut into an opposing surface to cam the parts of the split end-portion away from the axis of the screw.

8. A set screw having a right-hand peripheral screw thread and an expansible end-portion having a terminal surface formed with a left-hand spiral thread.

9. A set screw having a peripheral screw thread, an expansible end-portion, and projections on the terminal surface of the latter each having cutting edges at one end and a prolongation of spiral shape adjacent thereto.

10. A set screw having in combination a right-hand screw-threaded side-wall, and an end surface formed with a left-hand spiral screw thread disposed substantially in a radial plane, the end-portion of the set screw adjacent such surface being split by diametric slots, and such slots intersecting the spiral screw thread to form cutting edges enabling such thread to cut into an opposing surface when the screw is driven home.

11. A set screw having in combination a peripheral screw thread and a split working end provided with ridges cutting into an opposing surface to cam the parts of the split end outward away from the axis of the set screw.

12. A set screw having a peripheral thread for engagement with the internal thread of a tapped hole, a split end portion, and integral means on the latter reacting under pressure of the end of the screw against an opposing surface to expand the split end portion of the screw against the walls of the hole.

EARLE F. ALLEN.